Patented July 28, 1931

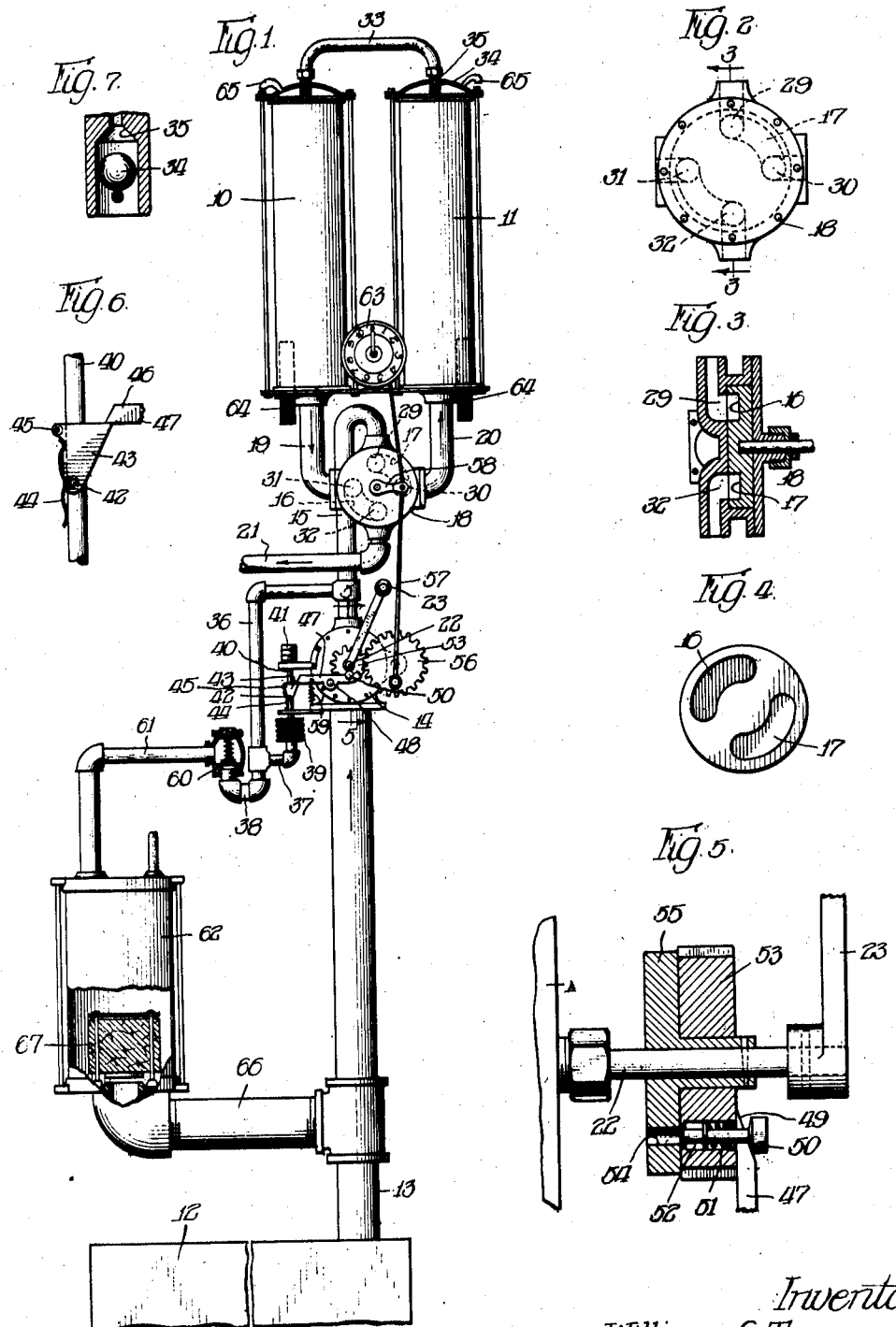

1,816,623

UNITED STATES PATENT OFFICE

WILLIAM S. TOWNSEND, OF ROCHESTER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

LIQUID DISPENSING APPARATUS

Application filed January 22, 1926. Serial No. 82,920.

This invention relates to liquid dispensing apparatus.

One object of the invention is to provide simple, reliable and efficient liquid dispensing apparatus which will permit a continuous flow of liquid to be measured and dispensed, thereby reducing to a minimum the time required for supplying a motor vehicle.

Another object is to provide apparatus of the above mentioned type in which liquid is accurately measured and dispensed.

Another object is to provide apparatus of the type indicated in which the various parts of the apparatus are timed and controlled to secure accurate measurement of liquid and facilitate the dispensing thereof.

Another object is to provide liquid dispensing apparatus in which the operation of the valve for controlling the passage of liquid to and from the measuring chambers is properly timed.

Another object is to alternately supply to each of a plurality of measuring chambers a predetermined amount of liquid, any excess supplied liquid being diverted in a controlled manner, excess pressure developed as a result of the supply of excess liquid being effective for controlling the operation of the valve which controls supply to and discharge of liquid from said measuring chambers.

Another object is to control the various parts of the apparatus and the flow of liquid in a manner to meet all of the requirements for successful commercial use.

These and other objects are accomplished by means of the arrangement disclosed on the accompanying sheet of drawings, in which—

Figure 1 is a vertical longitudinal sectional view, parts being in elevation, of liquid dispensing apparatus embodying my invention;

Figure 2 is a front elevation of the four-way control valve by means of which flow of liquid between the source of supply, measuring chambers and dispensing line is controlled;

Figure 3 is a detail sectional view of the valve taken in the plane of line 3—3 of Figure 2;

Figure 4 is a detail front elevation of the rotary valve member;

Figure 5 is an enlarged fragmentary sectional view taken in the plane of line 5—5 of Figure 1 and disclosing some of the timing or control parts by means of which the operation of the valve is controlled;

Figure 6 is an enlarged fragmentary sectional view of part of the timing control mechanism; and, Figure 7 is an enlarged fragmentary sectional view of the air connection between the measuring chambers and showing one of the float valves.

The various novel features of the invention will be apparent from the following description and drawings, and will be particularly pointed out in the appended claims.

Referring to the figures of the drawings, in which the apparatus is shown somewhat diagrammatically, it will be noted that the invention is illustrated in connection with continuous flow liquid dispensing apparatus including two preferably transparent measuring chambers or containers 10 and 11, into which liquid is forced from any suitable source represented by the liquid storage tank 12, the liquid being drawn therefrom, in this instance, through a pipe 13 by a pump 14 and then forced through a pipe 15 alternately through passageways 16 and 17 in a valve 18 and respectively through pipes 19 and 20 into said measuring chambers 10 and 11 respectively. After the liquid is measured within the measuring chambers 10 and 11, it is discharged alternately from the said chambers through the same pipes 19 and 20 and through the passageways 16 and 17 in valve 18 and out through the dispensing or service pipe 21, to which a hose or the like may be connected. The pump 14, in this instance, is a rotary pump and has a shaft 22 to which a crank handle 23 is secured whereby the pump may be actuated either by hand or motor.

As shown in Figure 1 of the drawings, liquid is being pumped trough the supply line, through valve port 29, valve arcuate passageway 17, valve port 30, pipe 20, into the measuring chamber 11. At the same time, liquid which has been measured in measuring chamber 10 is passing downwardly and outwardly through pipe 19, valve port 31, valve arcuate passageway 16, valve port 32, and out through dispensing pipe 21. As liquid rises in the measuring chamber 11, air is forced by said rising liquid from the upper part of said measuring chamber through an air pipe 33 into the upper part of measuring chamber 10. Air will continue to be transferred from chamber 11 to chamber 10 until the liquid rises up into engagement with and presses a float valve 34 into closed position against its seat 35. When the float valve 34 closes, the supply of liquid to the measuring chamber ceases, but the pump 14 continues to be operated for supplying an excess amount of liquid. As a result thereof, the pump continuing in operation, liquid pressure is built up in the supply pipe 15 and pipes 36, 37 and 38, the first pipe 36 being connected to the supply pipe 15, and pipes 37 and 38 being connected to pipe 36. Pipe 37 is connected to a sylphon bellows or the like 39 having an operating rod 40 which is provided with weights 41 to prevent operation of the sylphon bellows until a certain predetermined liquid pressure has been built up in the sylphon bellows. Pivotally mounted at 42 upon the sylphon operating rod 40 is a pawl 43 which is yieldably pressed into the position shown in Figures 1 and 6 by a suitable spring 44. This pawl 43 is limited in its clockwise rotative movement by a stop 45 which is adapted to engage the rod 40, as shown in Figures 1 and 6. One end 46 of a lever 47 is in engagement with the pawl 43, the lever being pivotally supported at an intermediate point 48. By referring to Figure 5, it will be noted that the opposite end of said lever 47 is provided with a cam 49 which is holding a plunger 50 in its outermost position against the tension of a spring 51. The spring pressed plunger 50 is mounted within a pocket 52 of a gear 53 loosely mounted upon the pump shaft 22. Said spring pressed plunger when free, however, is adapted to pass into a corresponding opening 54 in a collar 55 secured to the pump shaft 22. When the spring pressed plunger 50 is freed from the lever 47 and the opening 54 passes into register with the plunger, the latter snaps into the opening, and the gear 53 is thereby actuated during pump actuation for driving another gear 56 which is pivotally connected to a rod 57 in turn connected to an arm 58 on the shaft of the reversible control valve 18. From the above it will be apparent that when the measuring chamber 11, for example, has been completely filled and the pump 14 continues to operate, the fluid pressure will be built up in the supply pipe 15 and pipes 36, 37 and 38, the excess fluid pressure first being effective for expanding the sylphon bellows 39 and raising the rod 40 for causing the pawl 43 to move the cam portion 49 of the lever 47 out of engagement with the spring pressed plunger 50 for liberating the latter. With the pump 14 still in operation, the spring pressed plunger, which then rides upon the surface of the collar 55 until the opening 54 presents itself to the plunger, enters the opening for causing actuation of the gear 53, and through the connections hereinabove described, causing a reversal of the control valve 18. It will be understood that the ratio of gears 53 and 56 is such that one revolution of gear 53, and consequently crank 23 and pin 50, will cause gear 56, to rotate valve 18 through ninety degrees, thereby opening communication between chamber 10, pipe 19, port 31, valve passageway 17, port 29, pipe 15, pump 14 and the source of supply 12. At the same time, communication will be established between chamber 11, pipe 20, port 30, valve passageway 16, port 32 and service pipe 21. Practically immediately after the lever 47 is actuated by the pawl 43, a spring 59 returns the lever 47 to a position where when the spring pressed plunger 50 passes through one revolution with its gear 53, the spring pressed plunger 50 will be automatically disengaged from the collar 55 so that the control valve 18 after being rotated through its reversing movement of 90 degrees will be permitted to stop.

Continued pumping movement of the pump is permitted for causing the actuation of the control valve 18 by virtue of the fact that immediately after the sylphon bellows 39 has been actuated, a spring pressed relief valve 60 operatively associated with pipe 38 is opened for permitting the flow of excess pumped liquid through the pipes 36 and 38, through pipe 61, into an excess flow receptacle 62. It will be appreciated that just as soon as the control valve 18 is reversed from the position shown in Figure 1 the liquid previously pumped into the measuring chamber 11 will pass outwardly therefrom through pipe 20, valve passageway 16 and service line 21, and at the same time liquid will be supplied to the other measuring chamber 10 from supply pipe 15, through valve passageway 17 and pipe 19, air being transferred from the upper part of measuring chamber 10 through air transfer pipe 33 into measuring chamber 11. It will be understood that when the measuring chamber 10 is completely filled, excess liquid pressure again will be built up in supply pipe 15 and sylphon bellows 39 for connecting the pump mechanism to the control reversing valve 18 for reversing the valve back into a position corresponding to that shown in Figure 1 wherein liquid will then be discharged from measuring chamber 10 as liquid is being supplied to measuring chamber 11, it being understood that the relief valve 60 is operated at the proper time as above described for permitting the excess flow of liquid to pass into the excess flow receptacle 62. By means of the sylphon bellows arrangement described, means is provided for timing the change of supply from one measuring chamber to the other and also timing the discharge from said chambers, said timing means being actuated by a so-called back pressure developed in the liquid supply pipe after one or the other of said measuring chambers has been completely filled, thereby controlling with the greatest accuracy and precision the measurement of liquid to be measured and discharged.

Indicating mechanism 63 may be operatively connected to the reversing valve 18 in any desirable manner to indicate the number of gallons measured. Calibrating plugs 64 are shown for calibrating the measuring chambers 10 and 11. Suitable vent control connections 65 are provided at the upper end of each of the measuring chambers 10 and 11 to connect the interior of said chambers to the atmosphere when it is desired to empty said measuring chambers when the other of said measuring chambers is not being filled. Excess flow liquid supplied to the excess flow receptacle 62 is returned from said receptacle to the supply line 13 through a pipe 66, the return of liquid from the excess flow receptacle being controlled by a float valve 67. When the liquid in the receptacle 62 is below a certain predetermined level, the float valve 67 is closed; but when liquid in said receptacle 62 rises above that predetermined level, the float valve 67 is raised for permitting liquid to be drawn back into the supply line by the pump 14. The connection including pipes 36, 38, 61, 66 and excess flow receptacle 62 constitutes a by-pass around a portion of the supply pipe, the sylphon bellows 39 and the relief valve 60 being associated with the said by-pass.

It is my intention to cover all modifications of the invention falling within the spirit and scope of the following claims:

I claim:

1. In liquid dispensing apparatus, the combination of a measuring container, means for supplying liquid thereto, means for controlling the supply of liquid to said container, a by-pass around the means for supplying liquid to said container, means associated with said by-pass responsive to liquid pressure developed in the supply means and by-pass for timing the operation of said controlling means, and means whereby excess pressure in said supply pipe and by-pass is relieved, said last named means comprising a valve limiting the pressure maintained on the supply side of said second named means.

2. In liquid dispensing apparatus, the combination of a measuring container, a supply pipe associated therewith, means for supplying liquid to said container, means for controlling the supply of liquid to said container, a by-pass around the means for supplying liquid to said container, means associated with said by-pass responsive to liquid pressure developed in the supply means and by-pass for timing the operation of said controlling means, means whereby excess pressure in said supply pipe and by-pass is relieved, and means for permitting return of the excess supplied liquid to said supply pipe.

3. In liquid dispensing apparatus, the combination of a plurality of measuring containers, means for supplying liquid thereto, a reversible valve for controlling the supply of liquid alternately to said containers, and means on the supply side of said valve responsive to liquid pressure on said supply side for timing the operation of said valve.

4. In liquid dispensing apparatus, the combination of a plurality of measuring containers, means for supplying liquid thereto, a reversible valve for controlling the supply of liquid to and the discharge of liquid from said containers, an excess flow connection to said liquid supply means, and means responsive to liquid pressure developed in said supply means and at least a portion of said excess flow connection for timing the operation of said reversible valve.

5. In liquid dispensing apparatus, the combination of a plurality of measuring containers, a supply pipe through which liquid is supplied to said containers, a reversible valve for controlling the supply of liquid to said containers, a pump for forcing the liquid through said pipe, a valve controlled by-pass connection around a portion of said supply pipe and connected thereto on opposite sides of said pump whereby excess pumped liquid will be forced from said supply pipe on one side of said pump and returned to said supply pipe on the other side of said pump, and means responsive to liquid pressure in said by-pass connection for timing the operation of said reversible valve.

6. In liquid dispensing apparatus, the combination of a plurality of measuring containers, a supply pipe through which liquid is supplied to said containers, a reversible valve for controlling the supply of liquid to said containers, a pump for forcing the liquid through said pipe, a valve controlled by-pass connection around a portion of said supply pipe and connected thereto on opposite sides of said pump whereby excess pumped liquid will be forced from said supply pipe on one side of said pump and returned to said supply pipe on the other side of said pump, means responsive to liquid pressure in said by-pass connection for timing the operation of said reversible valve, and a connection between said pump and valve whereby the latter is actuated by the former.

7. In liquid dispensing apparatus, the combination of a plurality of measuring containers, a pump for supplying liquid to said containers, a reversible valve for controlling the supply of liquid to said containers, a releasable connection between said pump and reversible valve whereby the latter may be actuated by the former, and means including pressure means on the supply side of said measuring containers for controlling the connection between said pump and reversible valve.

8. In liquid dispensing apparatus, the combination of a plurality of measuring containers, means for supplying liquid thereto, a valve for controlling the supply of liquid alternately to said containers, and means on the supply side of said valve responsive to liquid pressure for timing the operation of said valve.

9. In liquid dispensing apparatus, the combination of a plurality of measuring containers, a supply pipe through which liquid is supplied to said containers, a valve for controlling the supply of liquid to said containers, a pump for forcing the liquid through said pipe, a valve controlled by-pass connection around a portion of said supply pipe and connected thereto on opposite sides of said pump whereby excess pumped liquid will be forced from said supply pipe on one side of said pump and returned to said supply pipe on the other side of said pump, and means responsive to liquid pressure in said by-pass connection for timing the operation of said valve.

10. In liquid dispensing apparatus, the combination of a plurality of measuring containers, a supply pipe through which liquid is supplied to said containers, a value for controlling the supply of liquid to said containers, a pump for forcing the liquid through said pipe, a valve controlled by-pass connection around a portion of said supply pipe and connected thereto on opposite sides of said pump whereby excess pumped liquid will be forced from said supply pipe on one side of said pump and returned to said supply pipe on the other side of said pump, means responsive to liquid pressure in said by-pass connection for timing the operation of said valve, and a connection between said pump and valve whereby the latter is actuated by the operation of the former.

11. In liquid dispensing apparatus, the combination of a plurality of measuring containers, a supply pipe through which liquid is supplied to said containers, a valve for controlling the supply of liquid to said containers, a pump for forcing the liquid through said pipe, a by-pass connection around a portion of said supply pipe and connected thereto on opposite sides of said pump whereby excess pumped liquid will be forced from said supply pipe on one side of said pump and returned to said supply pipe on the other side of said pump, means responsive to liquid pressure in said by-pass connection for timing the operation of said valve, a connection between said pump and valve whereby the latter is actuated by the operation of the former, and a relief valve mounted in said by-pass connection for permitting the pump to continue to operate for reversing the valve when excess liquid is being pumped.

12. In liquid dispensing apparatus, the combination of a measuring container, a supply pipe through which liquid is supplied thereto, a discharge pipe through which liquid is exhausted therefrom, a valve for controlling the supply of liquid to said container through said supply pipe and from said container through said discharge pipe, a pump for pumping liquid to said container through said supply pipe, a positive connection between said pump and valve for operation of said valve, said connection being inoperative when said container is filling, means for diverting excess liquid when said container is full, and means responsive to liquid pressure developed by the diverted liquid to cause operation of said positive connection for operating said valve whereby said container and discharge pipe are connected for exhausting liquid from said container.

Signed at Rochester, Pennsylvania, this 18th day of January, 1926.

WILLIAM S. TOWNSEND.